(12) United States Patent
Ye

(10) Patent No.: US 12,471,189 B1
(45) Date of Patent: Nov. 11, 2025

(54) FLEXIBLE WARMING PAD

(71) Applicant: Jianzhong Ye, Zhejiang (CN)

(72) Inventor: Jianzhong Ye, Zhejiang (CN)

( * ) Notice: Subject to any disclaimer, the term of this patent is extended or adjusted under 35 U.S.C. 154(b) by 0 days.

(21) Appl. No.: 19/293,889

(22) Filed: Aug. 7, 2025

(51) Int. Cl.
   *H05B 3/36* (2006.01)

(52) U.S. Cl.
   CPC ..................... *H05B 3/36* (2013.01)

(58) Field of Classification Search
   CPC . A47J 36/2483; A47J 39/02; H05B 2203/003; H05B 2203/014; H05B 2203/016; H05B 3/145; H05B 3/146; H05B 3/148; H05B 3/34; H05B 3/36
   USPC ......................................................... 219/528
   See application file for complete search history.

(56) References Cited

U.S. PATENT DOCUMENTS

| | | | | |
|---|---|---|---|---|
| 3,547,725 A * | 12/1970 | Tabor | ...................... | H05B 3/36 219/528 |
| 4,270,040 A * | 5/1981 | McMullan | ............... | H05B 3/36 219/544 |
| 4,574,186 A * | 3/1986 | Sakai | ...................... | H05B 3/36 392/435 |
| 12,109,739 B1 * | 10/2024 | Chen | ...................... | B29C 43/18 |
| 2010/0116818 A1 * | 5/2010 | Gabbay | ..................... | H05B 6/36 219/528 |
| 2017/0311388 A1 * | 10/2017 | Hsu | .......................... | H05B 3/36 |
| 2022/0056193 A1 * | 2/2022 | Liao | ..................... | C08G 18/4854 |

* cited by examiner

*Primary Examiner* — Sang Y Paik

(57) ABSTRACT

The present invention discloses a flexible warming pad: including a controller, an upper layer, a flexible heating pad, and a lower layer, wherein an upper portion of the lower layer is provided with a thermal insulation layer, the thermal insulation layer and the lower layer are integrally formed, an upper end of the thermal insulation layer is provided with the upper layer, one end portion of the lower layer and the upper layer is provided with a notch penetrating through the lower layer, the thermal insulation layer, and the upper layer, the controller is installed in the notch, the upper end of the thermal insulation layer is provided with a mounting groove, the flexible heating pad is provided under the upper layer, the upper layer and the flexible heating pad are synthesized by a spraying process or a fluid-based uniform thermal bonding process.

2 Claims, 6 Drawing Sheets

FLEXIBLE WARMING PAD

FIELD OF THE APPLICATION

The present invention relates to the technical field of thermal-retaining food boards, specifically refers to a flexible warming pad.

BACKGROUND

A thermal-retaining food board can keep cooked dishes warm, effectively preventing them from becoming cold, especially suitable for use in winter. During use, simply place the warming pad on a countertop, activate it, set the warming temperature, and place cooked dishes on the warming pad. It is simple to operate and deeply loved by consumers. Currently available warming pads are generally rigid warming pads or flexible warming pads. Rigid warming pads achieve storage through a rotating shaft mechanism or disassembly mechanism; flexible warming pads achieve storage by coiling.

Among them, flexible warming pads are deeply loved by people due to their convenience in use and storage. However, most existing flexible warming pads have silicone pads thermally formed together, exhibiting the following problems:

Adhesion problem: Since the heating layer and the other two layers are integrally formed, when bonded together, the heating layer and the other two layers are not sufficiently firm, easily bulging after heating;

Thermal insulation problem; Most warming pads on the market cannot adopt higher-temperature heating elements. Due to heat dissipation at the lower end, excessively high temperatures and lack of effective thermal insulation methods cause countertop materials to cannot withstand excessive temperatures, failing to satisfy users requiring higher temperatures;

Therefore, to solve the above technical problems, a flexible warming pad is designed.

SUMMARY

The technical problem to be solved by the present invention is to overcome the defects of the above-mentioned technology, providing a flexible warming pad.

To solve the above technical problem, the technical solution provided by the present invention is a flexible warming pad: including a controller, an upper layer, a flexible heating pad, and a lower layer, wherein an upper portion of said lower layer is provided with a thermal insulation layer, wherein said thermal insulation layer and said lower layer are integrally formed, wherein an upper end of said thermal insulation layer is provided with said upper layer, wherein one end portion of said lower layer and said upper layer is provided with a notch penetrating through said lower layer, said thermal insulation layer, and said upper layer, wherein said controller is installed in said notch, wherein said upper end of said thermal insulation layer is provided with a mounting groove, wherein said flexible heating pad is provided under said upper layer, wherein said upper layer and said flexible heating pad are synthesized by a spraying process or a fluid-based uniform thermal bonding process, wherein said flexible heating pad is laid in said mounting groove, wherein said flexible heating pad and said controller are electrically connected;

wherein a material of said upper layer is high-temperature-resistant silicone synthetic leather;

wherein materials of said thermal insulation layer and said lower layer are high-temperature-resistant PU soft rubber material;

wherein said upper layer, said thermal insulation layer, and said lower layer are fixed by a thermal bonding process.

As an improvement, said thermal insulation layer and said lower layer form a plurality of protruding support structures extending downwardly from their lower ends, said plurality of support structures being distributed in an arrayed pattern, thereby forming a turbulent heat dissipation mode, further facilitating heat dissipation of said thermal insulation layer and said lower layer.

Advantages of the present invention compared to prior art are as follows:

The upper layer, thermal insulation layer, and lower layer are fixed by a thermal bonding process, making bonding between the upper layer, thermal insulation layer, and lower layer extremely secure. Moreover, the thermal insulation layer and lower layer are integrally formed, ensuring bonding stability between the lower layer and upper layer remains unaffected even during heating, completely eliminating adverse phenomena such as bulging;

Said thermal insulation layer and lower layer are integrally formed, the material of the thermal insulation layer being high-temperature-resistant PU soft rubber material, thereby achieving superior thermal insulation effect. Furthermore, the thermal insulation layer and lower layer form a plurality of protruding support structures extending downwardly from their lower ends, said plurality of support structures being distributed in an arrayed pattern, thereby forming a turbulent heat dissipation mode. This configuration blocks heat conduction through the support structures while allowing air circulation through gaps between the support structures, significantly enhancing heat diffusion and improving thermal insulation performance. Consequently, the product satisfies users requiring higher temperatures.

The upper layer is made of high-temperature-resistant silicone synthetic leather and synthesized with the flexible heating pad via spraying process or fluid-based uniform thermal bonding process. The overall thickness is extremely thin 0.3 mm-1 mm, enabling rapid heat transfer to utensils requiring heating, while significantly reducing heat dissipation burden and improving thermal insulation performance of the lower layer, thereby achieving substantially enhanced heat dissipation compared to conventional pads.

BRIEF DESCRIPTION OF THE DRAWINGS

As shown in FIGS. 1-6:

1. Controller
2. Upper Layer
3. Flexible Heating Pad

4. Lower Layer
5. Mounting Groove
6. Thermal Insulation Layer
7. Support Structure
8. Notch While the technology is susceptible to various modifications and alternative forms, specifics thereof have been shown by way of example and drawings, and will be described in detail. It should be understood, however, that the application is not limited to the particular embodiments described. On the contrary, the application is to cover modifications, equivalents, and alternatives falling within the spirit and scope of the technology.

DETAILED DESCRIPTION OF EMBODIMENTS

The embodiments of the present technology described herein are not intended to be exhaustive or to limit the technology to the precise forms disclosed in the following detailed description. Rather, the embodiments are chosen and described so that others skilled in the art can appreciate and understand the principles and practices of the present technology.

All publications and patents mentioned herein are hereby incorporated by reference. The publications and patents disclosed herein are provided solely for their disclosure. Nothing herein is to be construed as an admission that the inventors are not entitled to antedate any publication and/or patent, including any publication and/or patent cited herein.

Figure 1:
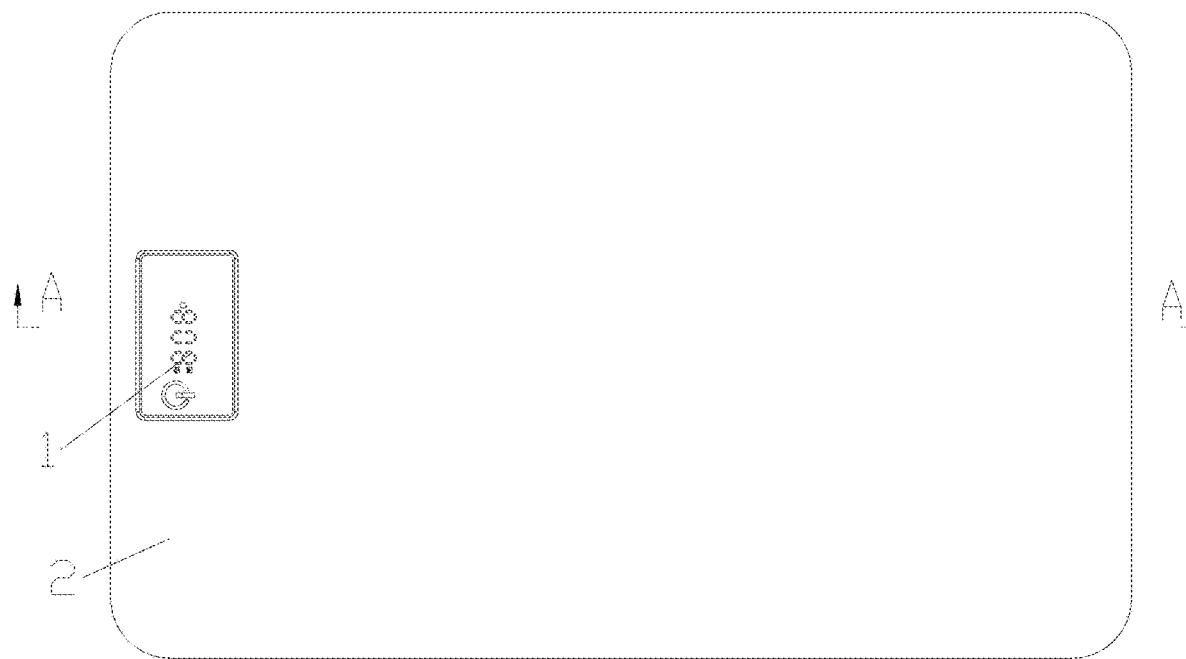
FIG. 1 is a top view of a flexible warming pad according to the present invention.
Figure 2:
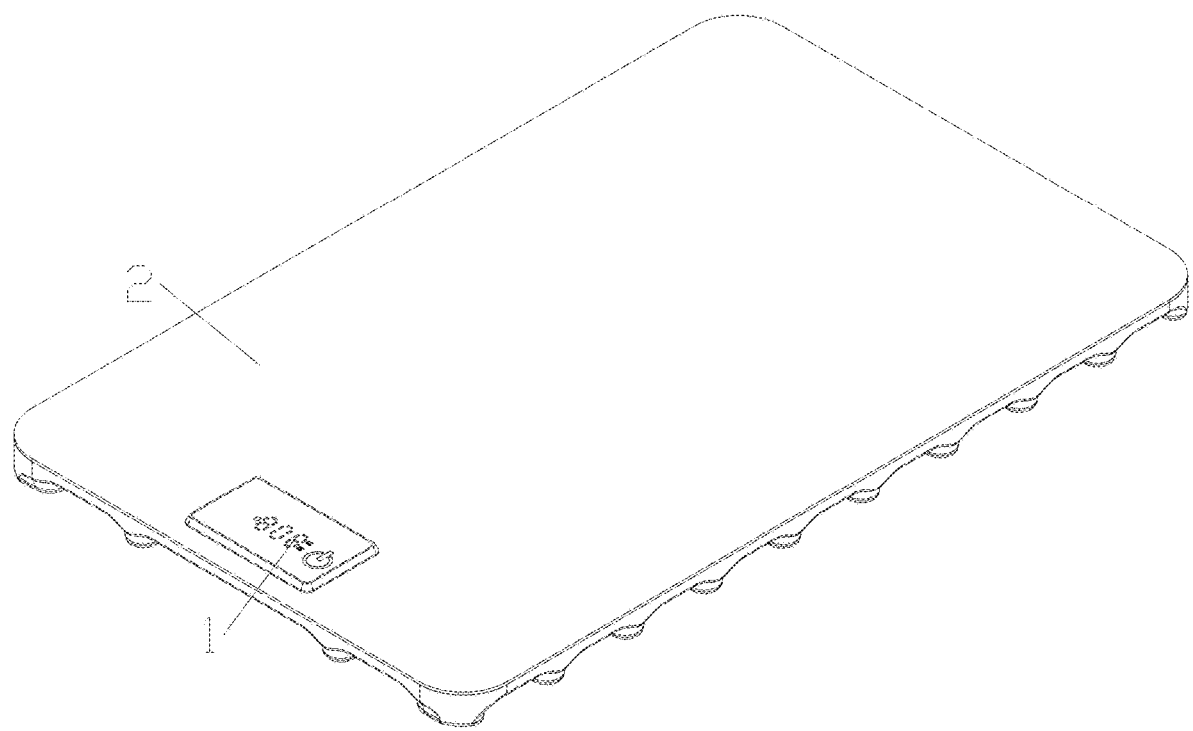
FIG. 2 is a schematic perspective structural view from above of the flexible warming pad according to the present invention.
Figure 3:
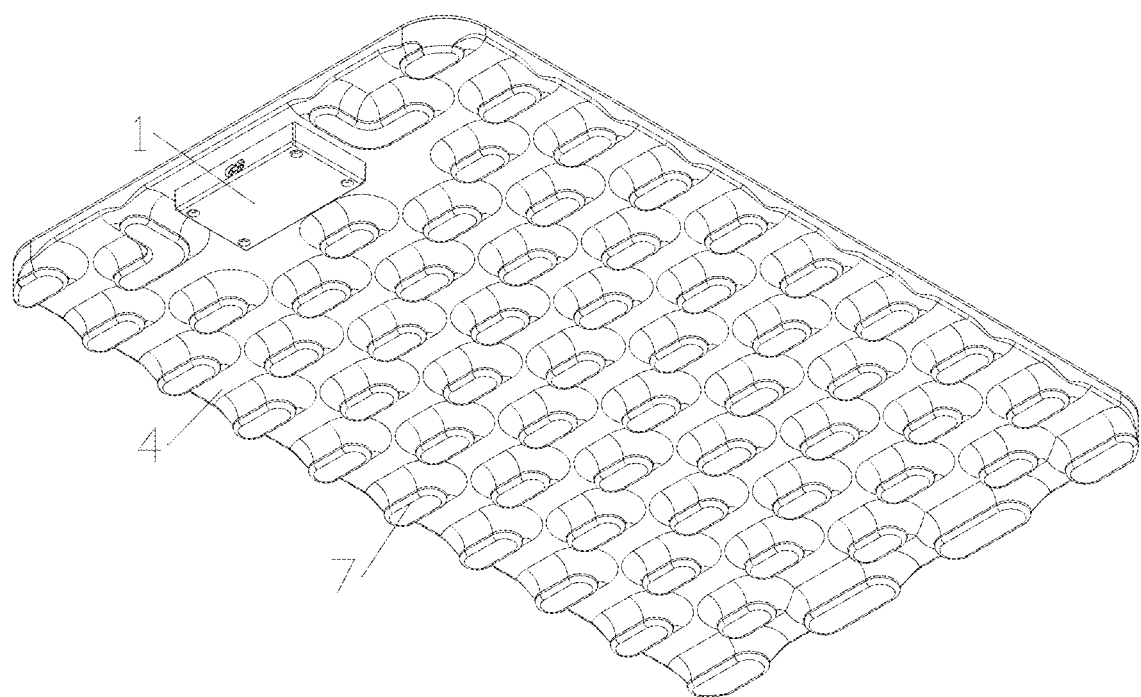
FIG. 3 is a schematic perspective structural view from below of the flexible warming pad according to the present invention.
Figure 4:
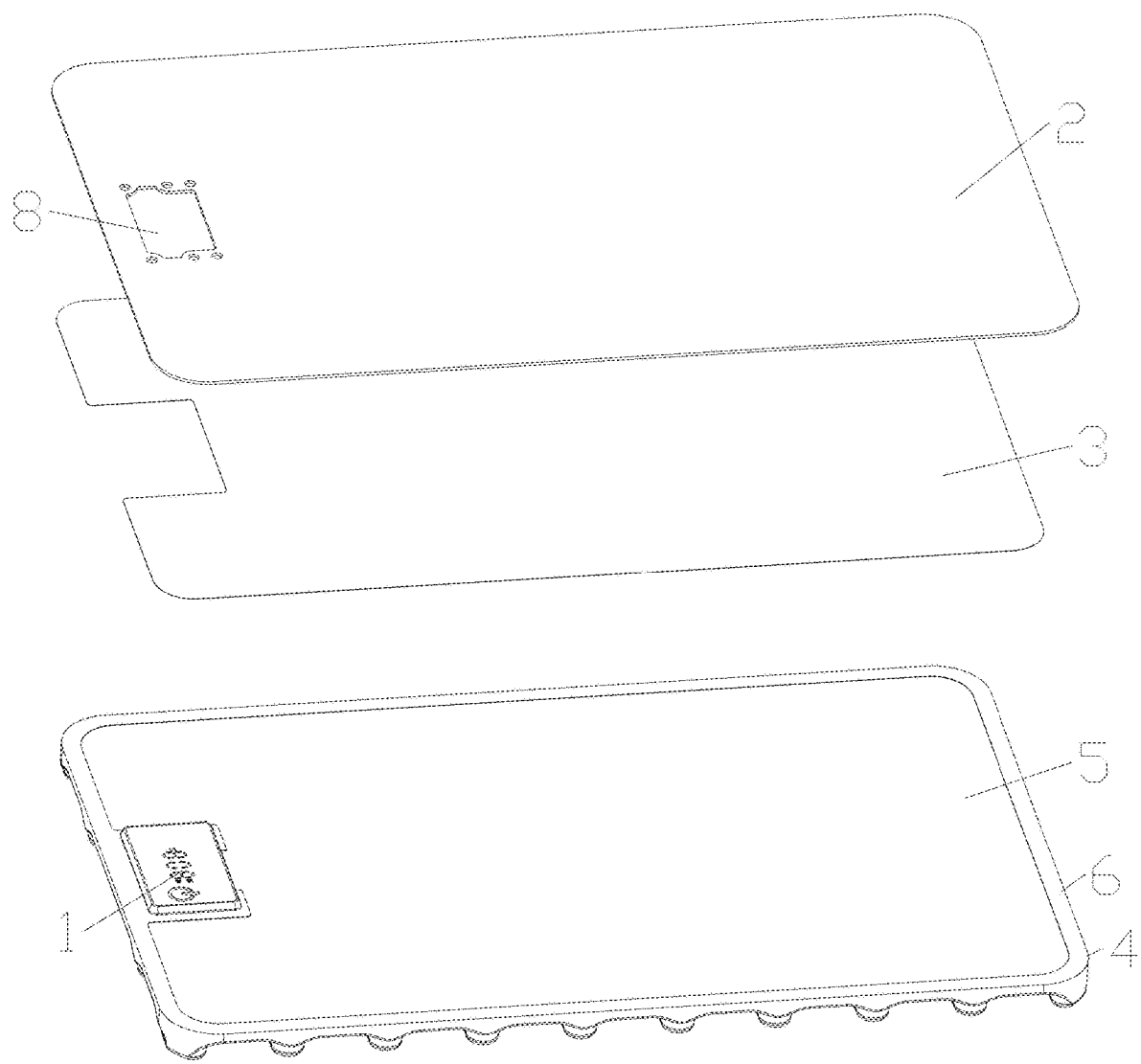
FIG. 4 is a schematic structural view of the flexible warming pad in a disassembled state according to the present invention.
Figure 5:
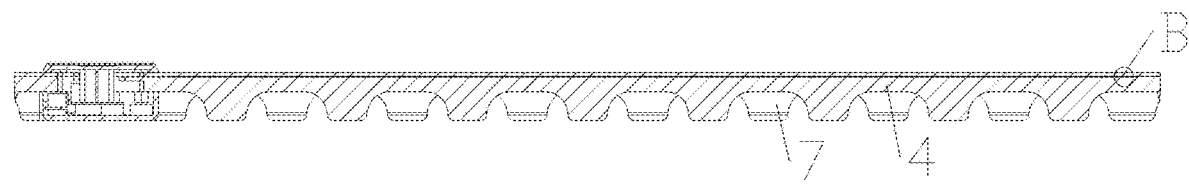
FIG. 5 is a cross-sectional view taken along line A-A in FIG. 1.
Figure 6:
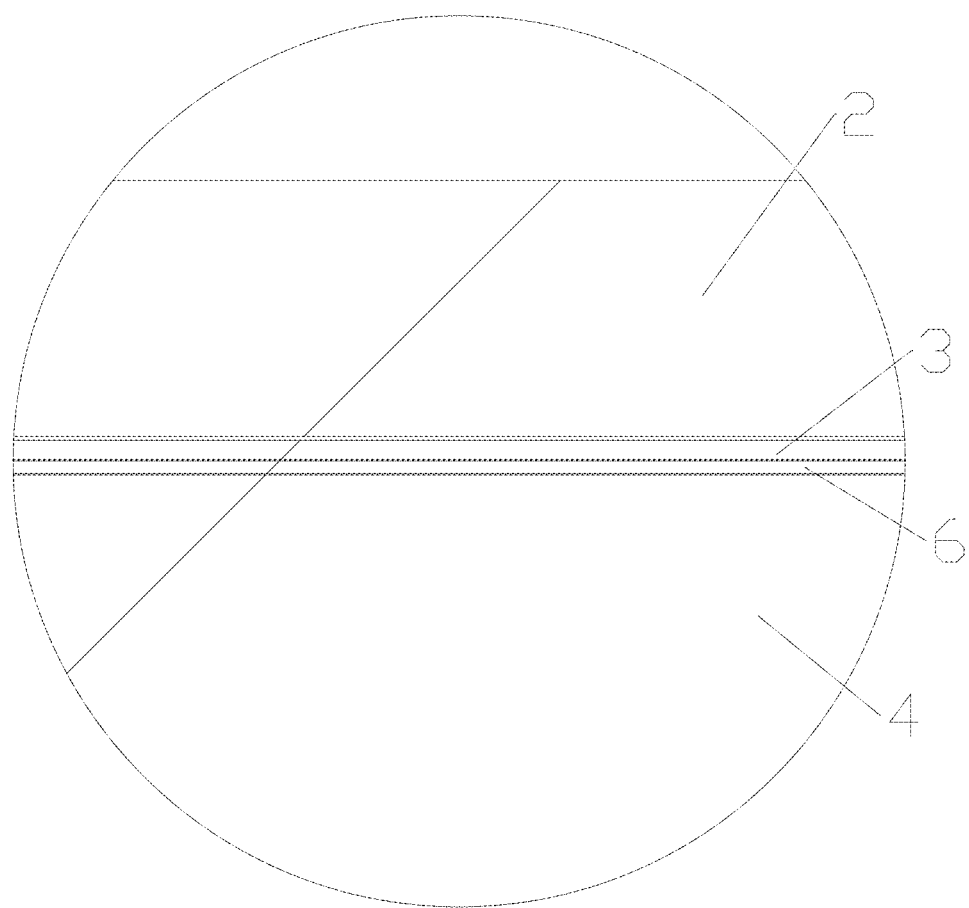
FIG. 6 is a partially enlarged view of portion B in FIG. 5.

As shown in FIGS. 1-6, a flexible warming pad includes a controller 1, an upper layer 2, a flexible heating pad 3, and a lower layer 4. An upper portion of said lower layer 4 is provided with a thermal insulation layer 6. Said thermal insulation layer 6 and said lower layer 4 are integrally formed. An upper end of said thermal insulation layer 6 is provided with said upper layer 2. One end portion of said lower layer 4 and said upper layer 2 is provided with a notch 8 penetrating through said lower layer 4, said thermal insulation layer 6, and said upper layer 2. Said controller 1 is installed in said notch 8. Said upper end of said thermal insulation layer 6 is provided with a mounting groove 5. Said flexible heating pad is provided under said upper layer. Said upper layer and said flexible heating pad are synthesized by a spraying process or a fluid-based uniform thermal bonding process. Said flexible heating pad is laid in said mounting groove. Said flexible heating pad 3 and said controller 1 are electrically connected. Said controller 1 is configured for temperature adjustment. Said controller 1 may include a display screen such that the temperature is displayable on the display screen, facilitating temperature adjustment.

Specifically, the flexible heating pad 3 may adopt a carbon fiber heating film, graphene heating soft pad, etc., which enables heating while not affecting coiling storage of the product.

Said upper layer 2 is made of high-temperature-resistant silicone synthetic leather; withstanding temperature ≥150° C., synthesized with the flexible heating pad 3 via spraying process or fluid-based uniform thermal bonding process. The overall thickness reaches 0.3 mm-1 mm, being extremely thin, thereby rapidly conducting heat to utensils requiring heating, enabling faster dish warming and improved thermal retention;

Said thermal insulation layer 6 is made of high-temperature-resistant PU soft rubber material. The lower layer 4 adopts PU soft rubber material. During integral molding preparation: first lay the PU soft rubber lower layer 4 on a mold, sealing and pressing its periphery; then evacuate air between the lower layer 4 and mold, causing the lower layer 4 to tightly adhere to the mold's bottom wall. The mold bottom is uniformly provided with multiple recessed grooves. The lower layer 4 conforming to the mold bottom forms corresponding recesses. Subsequently, pour PU soft rubber over the lower layer 4 and thermally press for integral molding using the mold, thus completing the integrally formed thermal insulation layer 6 and lower layer 4. At this stage, the recessed areas form protruding support structures 7, thereby creating thermal insulation barriers. The plurality of support structures are distributed in an arrayed pattern, forming a turbulent heat dissipation mode that enhances heat dissipation from the thermal insulation layer and lower layer;

Said upper layer 2, thermal insulation layer 6, and lower layer 4 are fixed by a thermal bonding process.

During specific implementation of the present invention:

After power connection, the controller 1 activates the flexible heating pad 3 to generate heat. Heat is uniformly transferred through the upper layer 2 to the bottom of tableware;

The PU soft rubber thermal insulation layer 6, lower layer 4, and support structures 7 collaboratively ensure the countertop temperature will not cause damage to the countertop.

In the description of embodiments of the present invention, it should be noted that if terms such as "center," "upper," "lower," "left," "right," "vertical," "horizontal," "inner," "outer," etc., indicate orientations or positional relationships, they are based on orientations or positional relationships shown in the drawings or conventional placement during use of the product. These terms are used solely for facilitating description of the present invention and simplifying the description, not to indicate or imply that the device or element must have a specific orientation or be constructed and operated in a specific orientation. Therefore, such terms shall not be construed as limiting the invention. Furthermore, terms "first," "second," "third," etc., are used only for distinguishing descriptions and shall not be construed as indicating relative importance.

Additionally, terms such as "horizontal," "vertical," "suspended," etc., do not require absolute horizontality or suspension but permit slight inclination. For example, "horizontal" merely indicates a direction relatively more horizontal than "vertical," not demanding complete horizontality; slight inclination is permissible.

In the description of embodiments of the present invention, "a plurality of" means at least two.

In the description of embodiments of the present invention, unless expressly specified or limited otherwise, terms "provided," "mounted," "connected," and "coupled" shall be broadly understood. For instance, connections may be fixed or detachable, or integrally formed; may be mechanical or electrical; may be direct connections or indirect connections via an intermediary; may be internal communication between two elements. Persons of ordinary skill in the art may understand specific meanings of the above terms in the present invention according to actual circumstances.

The above describes the present invention and its embodiments. This description is non-limiting, and the drawings illustrate only one implementation of the invention; actual structures are not limited thereto. In summary, if persons of ordinary skill in the art are inspired by this disclosure to design structural schemes and embodiments similar to the technical solution without creative effort and without departing from the inventive purpose of the present invention, they shall fall within the protection scope of the present invention.

The invention claimed is:

1. A flexible warming pad, comprising a controller, an upper layer, a flexible heating pad, and a lower layer, wherein an upper portion of said lower layer is provided with a thermal insulation layer, wherein said thermal insulation layer and said lower layer are integrally formed, wherein an upper end of said thermal insulation layer is provided with said upper layer, wherein one end portion of said lower layer and said upper layer is provided with a notch penetrating through said lower layer, said thermal insulation layer, and said upper layer, wherein said controller is installed in said notch, wherein said upper end of said thermal insulation layer is provided with a mounting groove, wherein said flexible heating pad is provided under said upper layer, wherein said upper layer and said flexible heating pad are synthesized by a spraying process or a fluid-based uniform thermal bonding process, wherein said flexible heating pad is laid in said mounting groove, wherein said flexible heating pad and said controller are electrically connected; wherein a material of said upper layer is high-temperature-resistant silicone synthetic leather;

wherein materials of said thermal insulation layer and said lower layer are high-temperature-resistant PU soft rubber material;

wherein said upper layer, said thermal insulation layer, and said lower layer are fixed by a thermal bonding process.

2. The flexible warming pad of claim 1, wherein the thermal insulation layer and said lower layer form a plurality of protruding support structures extending downwardly from their lower ends.

* * * * *